(12) United States Patent
Basso et al.

(10) Patent No.: US 7,003,582 B2
(45) Date of Patent: Feb. 21, 2006

(54) ROBUST NP-BASED DATA FORWARDING TECHNIQUES THAT TOLERATE FAILURE OF CONTROL-BASED APPLICATIONS

(75) Inventors: Claude Basso, Raleigh, NC (US); Natarajan Vaidhyanathan, Greensboro, NC (US); Colin Beaton Verrilli, Apex, NC (US); Rama Mohan Yedavalli, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 699 days.

(21) Appl. No.: 09/885,782

(22) Filed: Jun. 20, 2001

(65) Prior Publication Data

US 2003/0009584 A1    Jan. 9, 2003

(51) Int. Cl.
   *G06F 15/173* (2006.01)
(52) U.S. Cl. .................................. 709/242; 370/395.31
(58) Field of Classification Search ................ 719/310; 370/395.31; 709/242
   See application file for complete search history.

(56) References Cited

U.S. PATENT DOCUMENTS

| | | | |
|---|---|---|---|
| 5,826,253 A | | 10/1998 | Bredenberg |
| 5,938,775 A | | 8/1999 | Damani et al. |
| 6,009,266 A | | 12/1999 | Brownell et al. |
| 6,031,987 A | | 2/2000 | Damani et al. |
| 6,192,051 B1 | * | 2/2001 | Lipman et al. ............. 370/389 |
| 6,496,510 B1 | * | 12/2002 | Tsukakoshi et al. ........ 370/401 |
| 6,643,269 B1 | * | 11/2003 | Fan et al. .................... 370/254 |
| 6,643,706 B1 | * | 11/2003 | Marques et al. ............ 709/242 |
| 6,678,274 B1 | * | 1/2004 | Walia et al. ........... 370/395.52 |
| 6,876,625 B1 | * | 4/2005 | McAllister et al. ......... 370/221 |

* cited by examiner

*Primary Examiner*—Thomas Lee
*Assistant Examiner*—Li Zhen
(74) *Attorney, Agent, or Firm*—IBM Corporation

(57) ABSTRACT

In a network environment including one or more network processing (NP) devices implementing for communicating packets, each NP device supporting a forwarding table comprising entries to enable forwarding of received data packets from a source device to a destination device according to a routing protocol via a network connection, the network device routing receiving updated forwarding table entries from one or more network control devices executing routing protocol applications, a system and method for updating forwarding table entries comprises: generating for each forwarding table entry update, a data structure indicating identification of the routing protocol application and a version of a particular routing protocol application instance generating the entry update, the data structure received by the forwarding table and incorporated within a respective forwarding table entry; identifying for deletion forwarding table entries having data structures matching a designated selection criteria; and, deleting the designated forwarding table entries. By doing this old forwarding table entries in the forwarding table are updated efficiently without disrupting packet forwarding process.

12 Claims, 1 Drawing Sheet

ROBUST NP-BASED DATA FORWARDING TECHNIQUES THAT TOLERATE FAILURE OF CONTROL-BASED APPLICATIONS

BACKGROUND OF THE INVENTION

1. Field of the Invention

This invention relates generally to implementation of fault-tolerant behavior network processor-based devices and networking systems, more specifically to a system and methodology for maintaining the disruption-free operation of the forwarding plane in the context of a faltering control plane.

2. Discussion of the Prior Art

In today's networked world, bandwidth is a critical resource. Increasing network traffic, driven by the Internet and other emerging applications, is straining the capacity of network infrastructures.

It is increasingly evident that networking devices are playing pivotal roles in mission-critical applications. However, network connectivity is taken for granted, and disruption in network connectivity services has severe implications on productivity. Consequently, the networking devices have to be very robust.

It is further the case that the networking devices are also becoming increasingly quite complex due to: (1) the number of protocols to be supported are increasing; (2) the existing protocols are increasing in complexity to keep up with the rapid change of user applications; (3) the increase in bandwidth requirement; and, (4) the requirement to support all the complex features at wire speed. The burden on the manufacturers of networking devices is thus to build highly complex systems that are very robust.

More importantly, to be profitable, time to market is critical. That is, these systems need to be as quickly as possible to capture an early market share. To meet this burden, manufacturers resort to distributed system architecture: build/assemble the system from several proven well-tested components, irregardless of whether these components might have been acquired from different vendors with different price/performance characteristics. Though these components perform very well on their own individually, their combined system behavior might not be satisfactory. Temporary failure of one of the components could have detrimental cascading effect on other components and crash the system down.

Thus, manufacturers are looking for components that tolerate temporary failure of other components and continue to offer reasonable service.

One networking device, referred to herein as a network processor or "NP", has been defined as a programmable communications integrated circuit capable of performing one or more of the following functions: 1) Packet classification—identifying a packet based on known characteristics, such as address or protocol; 2) Packet modification—modifying the packet to comply with IP, ATM, or other protocols (for example, updating the time-to-live field in the header for IP; 3) Queue/policy management—reflects the design strategy for packet queuing, de-queuing, and scheduling of packets for specific applications; and, 4) Packet forwarding—transmission and receipt of data over the switch fabric and forwarding or routing the packet to the appropriate address.

NP-based networking devices are built from several components and in general have the architecture as depicted in FIG. 1. In the example networking system architecture 10, there are illustrated "n" Control Point (CP) processors 25 each of which may comprise a general purpose processor (GPP) having a physical or logical association with one or more of the Network Processors 12 in the system for enabling the customization and configuration of the Network Processor (NP) devices so that they may handle the forwarding of data packets and frames. As shown in FIG. 1, the control points 25 are connected to the network processor device 12 via a switch fabric 15. One NP device 12 is shown as supporting a number of external LAN or WAN interface ports 20 through which it receives and forwards data packets. It should be understood that the generic networking system architecture 10 depicted in FIG. 1 is for exemplary purposes and that other configurations are possible.

The generic networking system architecture 10 comprises two major software components: 1) the control point code base running on the GPP, and, programmable hardware-assist processors' picocode executing in each of the network processors. These two software components are responsible for initializing the system, maintaining the forwarding paths, and managing the system. From a software view, the system is distributed. The GPP (control point processor 25) and each picoprocessor run in parallel, with the CP communicating with each picoprocessor using a predefined application program interface (API) and control protocol. For purposes of description, as shown in FIG. 1, there are typically "m" protocols/software applications Al, . . . Ak, . . . Am, that run in the "n" control point processors CPl, . . . ,CPn 25. Typically, the NP device 12 receives packets via the data interfaces 20 which packets may belong to two categories: 1) protocol/application control packets; or, 2) data packets. If a control packet is received, then the NP device 12 will analyze the contents of the frame and may determine that this packet may be of interest to some application/protocol Aj running on control point CPk. Consequently, the NP device will forward the received control packet to the CPk. The applications/protocols will process these control packets, possibly store some information in the storage device available in the CP processor itself, and also send messages to the NP to effect addition, deletion, and/or modification of entries in the forwarding table 18 which entries represent the topology of the network as viewed by the networking system. This is herein referred to as the control-plane operation of the networking device. If a data packet is received, then the NP device 12 will analyze the contents of the frame, consult the forwarding table 18, determine the outgoing data interface/port 20 and forward the frame via that interface. This is referred to as the data-plane operation of the networking device. Thus, in a NP-based networking system, control-plane operations are performed by the control-point processor components whereas the data-plane operations are delegated to NP components. Further details regarding the general flow of a packet or frame received at an NP device may be found in commonly-owned, co-pending U.S. patent application Ser. No. 09/384,691 filed Aug. 27, 1999 and entitled "NETWORK PROCESSOR PROCESSING COMPLEX AND METHODS", the whole contents and disclosure of which is incorporated by reference as if fully set forth herein.

Traditionally, the relationship between the control plane and data plane is that of master and slave with the control plane acting as the master as it is responsible for populating and maintaining the forwarding table. If the NP fails and restarts, then the applications/protocols will populate the forwarding table once again, using the information that is stored in the CP processor 25.

Currently, as shown in FIG. 2, a control point CP-based application 26, for example, that carries out Open Shortest Path First (OSPF) forwarding operations, is responsible for loading and updating new entries of the forwarding table 18 for the NP device 12 via API 30. Thus, packet forwarding tables 18 are updated using the OSPF protocol, for example, which enables routers to understand the internal network architecture, i.e., within the autonomous network. As known, OSPF calculates the shortest path from an IP Source Address (SA) to IP Destination Address (DA). For example, when a subnet is moved/deleted within a network, OSPF will update the new shortest path to that changed/deleted subnet if required (i.e., if associated next hop changes). This requires forwarding tables 18 in all NP devices to be updated which entails deleting table entries and inserting new fields.

It should be understood that many CP-based applications running $CP_1-CP_n$ may be downloading and updating new entries of the forwarding table 18 for the NP devices. Specifically, each respective control point CP-based application $CP_1-CP_n$ gains knowledge of changing network configurations and generates/calculates respective protocol specific information for populating forwarding table entries of NP devices 12.

Each CP-based application particularly maintains a protocol specific routing table 28 including the packet routing information and updates its table with new packet routing information as it is generated, e.g. after a CP application failure, or becomes available. Via an application programming interface, this information is downloaded to one or more NP devices 12 so that entries in the NP forwarding table 18 may be updated.

Currently, there exists the problem of handling the failure and restarting of applications/protocols that run on the CP components. When these applications fail, the possibility exists of that most of the information that is stored in the control point may be lost. Traditionally, when applications/protocols restart they purge the forwarding table and both the NP and CP applications start reconstructing the information synchronously. That is, whenever the control plane restarts and the forwarding plane is also forced to restart in order to simplify the task of synchronizing information that is maintained in the NP and CP devices. The consequence of restarting the forwarding plane results in the disruptment of network connectivity.

It would be highly desirable to provide a system and method that provides for a smooth transition when updating entries of packet forwarding tables by CP applications when the CP application fails, and particularly, one that avoids the restarting of the data forwarding plane from scratch when the control point application restarts.

It would further be highly desirable to provide a system and method that provides for a smooth transition when updating entries of packet forwarding tables by CP by enabling the "aging out", i.e., deletion of the entries inserted by an old CP application instance.

SUMMARY OF THE INVENTION

It is an object of the invention to provide a system and method that provides for a smooth transition when updating entries of packet forwarding tables by CP applications when the CP application fails.

It is another object of the invention to provide a system and method that provides for a smooth transition when updating entries of packet forwarding tables by CP applications when the CP application fails, and particularly, one that avoids the restarting of the data forwarding plane from scratch when the control point application restarts.

According to the invention, there is provided, in a network environment including one or more network processing (NP) devices implementing for communicating packets, each NP device supporting a forwarding table comprising entries to enable forwarding of received data packets from a source device to a destination device according to a routing protocol via a network connection, the network device routing receiving updated routing table entries from one or more network control devices executing routing protocol applications, a system and method for updating forwarding table entries comprising: generating for each routing table entry update, a data structure indicating identification of the routing protocol application and a version of a particular routing protocol application instance generating the entry update, the data structure received by the forwarding table and incorporated within a respective forwarding table entry; identifying for deletion forwarding table entries having data structures matching a designated selection criteria; and, deleting the designated forwarding table entries. By doing this old forwarding table entries in the forwarding table are updated efficiently without disrupting packet forwarding process.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENT

This invention proposes two solutions that avoid the restarting of the forwarding plane from scratch when the control point application restarts. For the sake of simplicity, it is assumed for purposes of discussion that there is only one application/protocol that is running in one CP that is maintaining the forwarding table in NP.

According to first aspect of the invention, there is implemented an "Active/Backup" feature of the table management services (swap table). In this solution, two forwarding tables, herein referred to as active table "A" and backup table "B," are maintained in the NP device 12. Particularly, the NP device will always forward data packets using the information that is present in the first table, active table "A" (not shown). Whenever the control point application fails and restarts, the new information that is learned and is stored in the CP will be downloaded into the second table, e.g., table "B." In the meantime, the data packets will continue to be forwarded using table A and consequently there is no disruption in the network connectivity. After a fixed amount of time, when the backup table is ready, the control plane 25 will issue a command to the NP device to swap the names of the tables A and B and purge the forwarding table currently named B. From this point of time onwards, the NP picocode may now utilize the brand new routes and data packets will be forwarded using the latest information. Although this proposal meets the functional requirements, it presents a huge drawback in terms of scalability, for instance, when large tables are used, because memory requirements are essentially doubled, i.e., two forwarding tables need to be maintained at the NP device. Furthermore, the NP device temporarily may be acting on old routing information as it is not receiving updates when the CP applications crashes and is rebuilding the back-up forwarding table.

Figure 1:
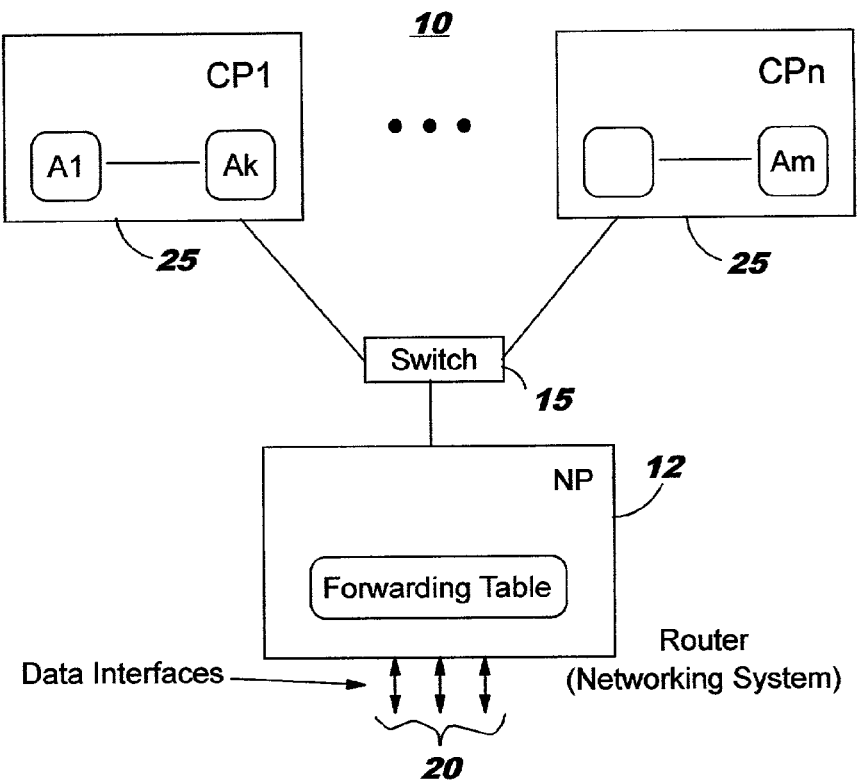
FIG. 1 illustrates a logical model of a generic Network Processor system 10.
Figure 2:
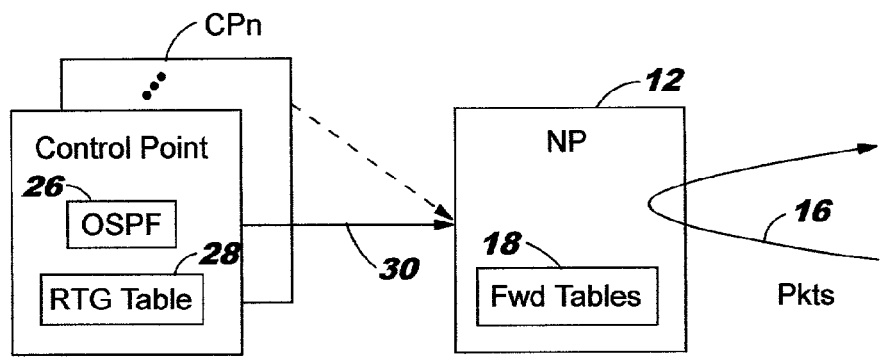
FIG. 2 illustrates the packet forwarding tables maintained by both a CP application and the NP device and the interaction for maintaining and updating packet forwarding information in the NP forwarding tables.

In a preferred aspect of the invention, there is provided a signature based solution for ensuring that the transition for updating packet routing information in NP devices as performed after a CP-based application has failed and is subsequently re-booted, is a smooth one. In this solution, a single forwarding table is maintained by the NP device with each packet forwarding entry including a signature field that includes two pieces of information: 1) an identification of the particular CP device and CP-protocol/application that is performing the downloading; and, 2) an "incarnation number," for example, indicating the version of the packet forwarding data received. For example, as shown in FIG. 1, if the ith version of application Aj that is running on the control point processor CPk downloaded a forwarding entry, then the signature corresponding to that forwarding entry would be <i, j, k>. As for the incarnation or version number, according to the invention, when a CP-based application is re-booted, e.g., after system crash, or a CP-based application associated with a particular protocol is re-started, the incarnation number associated with that CP application instance will be incremented. It should be understood that there may be only one application inserting entries in a given table at a given time or, if there are multiple applications they may share the same incarnation number, only their signature will be different. Preferably, the management (generation) of the incarnation number is performed by the CP original equipment manufacturer (OEM) application. It is assumed that when an application crashes it does not loose its version number.

According to the principles of the invention according to the preferred embodiment, a table incarnation synchronization process is then performed for "aging out", i.e., deleting the entries inserted by an old CP application instances.

The notion of table incarnation synchronization is as follows: after each crash/restart of a CP device or CP protocol application instance, the forwarding table at the NP device is updated with entries having a successive incarnation number. As provided by way of example discussed herein, it is typically the case that forwarding entries may have two incarnation numbers associated therewith. To "age out" the table, a table_incarnation_sync function is provided at the Network Processor Device Driver (NPDD) API level which performs a "clean-up" function by marking for deletion any forwarding table entry that does not matches a signature and incarnation number parameter that is passed as an input parameter to the table_incarnation_sync function.

Preferably, the execution time of this table_incarnation_sync function, e.g., assuming a forwarding table of 150K entries, is less than 1 second. Once marked "deleted", a table entry is no longer used by the forwarding picocode of the NP device. A background timer based picocode task is in charge of effectively removing the entry (freeing the leave and pattern search control blocks).

Thus, for example, an NP device forwarding Table 1 is provided having a variety of signatures associated with CP applications (designated by prefixes A, D, E, R, Z, Y) and an incarnation number associated with a respective designated version value of "10" for each CP application) as follows:

TABLE 1 prefixA incarn 10
    prefixD incarn10
    prefixE incarn10
    prefixR incarn10
    prefixZ incarn10
    prefixY incarn10

Assuming, CP-based applications designated by prefixes D, R, Z, Y and T have incarnation numbers updated to a value "11" in response to a re-boot operation as a result of a device, then the forwarding table entries will be updated to include the following updated forwarding table entry information as follows:

—>insert prefix D, 11
      —>insert prefix R, 11
      —>insert prefix Z, 11
      —>insert prefix Y, 11
      —>insert prefix T, 11

After the new updated entries are downloaded to the respective NP devices a new forwarding Table 2 comprising the following entries results:

TABLE 2 prefixA incarn10
    prefixD incarn11
prefixE incarn 10
    prefixR incarn11
    prefixZ incarn11
    prefixY incarn11
    prefixT incarn11

It should be understood that the "older" forwarding table entries having designated prefix A and E are still used for packet forwarding by the NP device. After some amount time, e.g., delta T, the control point application sends a command to the NP device to purge all entries that have a signature value to be strictly less than the current version number. This gets rid of all the stale information from forwarding table. For example, after updating of new forwarding table entries have been stabilized, the CP application invokes a "table_incarnation_sync" function that is passed a parameter instructing clean-up for all entries having a particular selection criteria, e.g., signature and incarnation number. In the present example, a parameter may be passed indicating all forwarding entries with incarnation numbers <11, i.e., table_incarnation_sync "11", be deleted. Preferably, this table_incarnation_sync function scans each of the forwarding entries in the forwarding table that meets the selection criteria and marks them for deletion. As a forwarding table typically comprises a binary tree structure, efficient scanning techniques for ascertaining the designations at each of the leaves (table entries) may be implemented. For instance, use may be made of memory pointers (not shown) that link each of the leaves for enabling efficient scanning of the forwarding table entries. As a result of executing this example table_incarnation_sync function, the following Table 3 at the NP device results with entries having prefix A and E marked as being deleted, i.e., no longer used:

TABLE 3 prefixA incarn10, deleted
    prefixD incarn11
    prefixE incarn10, deleted
    prefixR incarn11

TABLE 3-continued prefixZ incarn11
prefixY incarn11
prefixT incarn11

Finally, a background task is initiated that scans each of the forwarding entries in the forwarding table at the NP device marked as deleted and deletes all entries so marked, e.g., the entries designated with prefix A and E and incarnation value 10. As a result of the background task, the NP device results in a new Table 4 having entries with the updated incarnation as follows:

TABLE 4 prefixD incarn11
prefixR incarn11
prefixZ incarn11
prefixY incarn11
prefixT incarn11

It should be understood that the selection criteria could include both a signature, i.e., a prefix indicating a specific CP device, and/or CP application, e.g., OSPF", and the incarnation number. Moreover, the selection criteria used by the table_incarnation_sync function may comprise a range of numbers and/or CP devices/applications.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

The invention claimed is:

1. In a network environment including one or more network processing (NP) devices implemented for communicating packets, each NP device supporting a forwarding table comprising entries to enable forwarding of received data packets from a source device to a destination device according to a routing protocol via a network connection, said network processing device receiving forwarding table entries from one or more network control devices executing one or more routing protocol applications, a method for updating forwarding table entries of an existing forwarding table when a routing protocol application has failed in a network control device comprising:

a) generating for each forwarding table entry, a data structure indicating identification of the routing protocol application and a version of a particular routing protocol application instance generating said entry, said data structure received by said existing forwarding table and incorporated within a respective forwarding table entry;

b) upon re-starting a failed routing protocol application in a network control device, incrementing a version value of that re-started routing protocol application instance;

c) updating said data structures of the existing forwarding table entries with said incremented protocol application version values;

d) identifying for deletion those existing forwarding table entries having data structures matching a designated selection criteria including an indication of a prior protocol application version value; and, e) deleting said designated forwarding table entries, whereby forwarding table entries in said existing forwarding table are updated efficiently without disrupting packet forwarding process, and without disrupting network connectivity by having to reconstruct a new forwarding table.

2. The method for updating forwarding table entries in accordance with claim 1, wherein said selection criteria includes an identification of the routing protocol application, said identifying step d) including the step of identifying for deletion said forwarding table entries having g data structure indicating a specific routing protocol application.

3. The method for updating forwarding table entries in accordance with claim 1, wherein said selection criteria includes a range of values indicating versions of particular routing protocol application instances, said identifying step d) including the step of: identifying for deletion said forwarding table entries having g data structure indicating a routing protocol application version value falling within a specific range of protocol application versions.

4. The method for updating forwarding table entries in accordance with claim 1, wherein said generating step a) is performed by one or more network control devices.

5. The method for updating forwarding table entries in accordance with claim 1, wherein said identifying step d) includes the step of generating said selection criteria.

6. The method for updating forwarding table entries in accordance with claim 1, wherein said step of generating said selection criteria is performed by said one or more network control devices.

7. The method for updating forwarding table entries in accordance with claim 1, wherein said forwarding table is a binary tree structure having leaves comprising said table entries, said identifying step d) including the step of implementing a scanning technique for ascertaining the indicated protocol application version number values at each of said leaves.

8. A system for ensuring packet routing in a networking environment including one or more network processing (NP) devices implemented for communicating packets, each NP device supporting a forwarding table comprising entries to enable forwarding of received data packets from a source device to a destination device according to a routing protocol via a network connection, said network processing device receiving forwarding table entries from one or more network control devices executing one or more routing protocol applications, said system comprising:

control mechanism for generating a data structure indicating identification of the routing protocol application and a version of a particular routing protocol application instance for each entry of an existing forwarding table, said control mechanism further incrementing a version value of a routing protocol application instance in response to re-starting that routing protocol application that has failed in a network control device;

communications interface for enabling forwarding of data structures updated to include said incremented version values of re-started routing protocol application instances to said NP device;

mechanism for incorporating received updated data structures into said forwarding table entry when updating said forwarding table entry; and, synchronization mechanism for identifying forwarding table entries having data structures matching a designated selection criteria that indicates a prior protocol application version value and deleting those forwarding table entries having data structures matching said designated selection criteria, whereby forwarding table entries in said existing forwarding table are undated efficiently without disrupting packet forwarding process, and without disrupting network connectivity by having to reconstruct a new forwarding table.

9. The system as claimed in claim 8, wherein said selection criteria includes an identification of the routing protocol application, said synchronization mechanism identifying for deletion said forwarding table entries having data structure indicating said routing protocol application.

10. The system as claimed in claim 8, wherein said selection criteria includes a range of values indicating versions of particular routing protocol application instances, said synchronization mechanism identifying for deletion said forwarding table entries having a data structure indicating a routing protocol application version value falling within said range.

11. The system as claimed in claim 8, wherein said control mechanism further generates said selection criteria.

12. The system as claimed in claim 8, wherein said forwarding table is a binary tree structure having leaves comprising said table entries, said synchronization mechanism performing scanning of said leaves for ascertaining indicated protocol application version number values of the corresponding data structures at each of the leaves.

* * * * *